United States Patent [19]

Dunton et al.

[11] Patent Number: 5,873,623
[45] Date of Patent: *Feb. 23, 1999

[54] VEHICLE DOOR DRAIN SLOT PLUG

[75] Inventors: Roy Powell Dunton, Clinton Township; David Benjamin Kwiecinski, Dearborn; Dennis Kudder Hassan, Bloomfield Hills; Paul James Bell, Novi, all of Mich.

[73] Assignee: Ford Global Technologies, Inc., Dearborn, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 743,065

[22] Filed: Nov. 4, 1996

[51] Int. Cl.$^6$ .......................................................... B60J 9/00
[52] U.S. Cl. ............................................ 296/154; 296/208
[58] Field of Search ..................................... 296/208, 154; 220/796, 797, 802, 241, 242, 780, 785, 360, 637.1; 114/212, 211, 197, 429, 82, 89

[56] References Cited

U.S. PATENT DOCUMENTS

| | | | |
|---|---|---|---|
| 2,821,429 | 1/1958 | Rantala | 296/154 X |
| 3,158,176 | 11/1964 | Toland | 296/208 X |
| 3,382,889 | 5/1968 | Heinz et al. | 296/154 X |
| 3,606,446 | 9/1971 | Leslie | 296/28 R |
| 3,701,560 | 10/1972 | Emmerson | 296/208 |
| 3,935,686 | 2/1976 | Dozois | 296/154 X |
| 4,216,707 | 8/1980 | Pennington | 98/2 |
| 4,560,083 | 12/1985 | Danico | 220/241 X |
| 4,700,981 | 10/1987 | Seyler | 296/208 X |
| 5,040,803 | 8/1991 | Cieslik et al. | 277/12 |

FOREIGN PATENT DOCUMENTS 2395203  1/1979  France.

*Primary Examiner*—D. Glenn Dayoan
*Assistant Examiner*—Jason Morrow
*Attorney, Agent, or Firm*—David B. Kelley; Roger L. May

[57] ABSTRACT

A vehicle door drain slot plug includes a base portion having opposing sides and opposing ends, the base portion being adapted to substantially cover the drain slot. First and second snap-tabs extend from the base portion near the opposing ends on one of the sides for securing the base portion with respect to the slot. A plurality of stand-off members extend from the one side of the base portion and are spaced about the periphery of the base portion for engaging the vehicle door to create a gap between the base portion and the vehicle door in order to allow water to drain out of the slot.

7 Claims, 3 Drawing Sheets

VEHICLE DOOR DRAIN SLOT PLUG

TECHNICAL FIELD

The present invention relates to vehicle door assemblies and, more particularly, to a plug adapted for plugging a vehicle door drain slot while allowing water to drain therethrough.

BACKGROUND OF THE INVENTION

In a vehicle assembly line, a vehicle door which comprises sheet metal components is secured to the vehicle frame, and the entire assembly is then dipped in a series of tubs as part of the painting process. The assembly is first dipped into a phosphate wash which cleans oil off of the assembly and coats it with phosphate, and then into an E-coat bath which acts as a corrosion resistant primer and provides an electrostatic charge on the sheet metal surface for later painting. As the assembly moves into and out of the tubs, the vehicle door assembly will fill with liquids, and large drain slots are provided at the bottom of the door assembly for draining out such liquids.

Such large drain slots are not desirable after the assembly has been painted. These slots allow pressure loss from inside the vehicle, which reduces climate control system efficiency. The slots also provide a means for road noise to enter the vehicle compartment, and they allow creation of a draft in the vehicle occupant compartment when the vehicle experiences a cross wind. Also, when a vehicle is traveling at a substantial speed, a vacuum is created at the drain slots which may draw dirt and dust into the door assembly, and further into the occupant cabin.

Accordingly, it is desirable to overcome the above-referenced shortcomings of vehicle drain slots while allowing liquid to be drained from the door assembly.

DISCLOSURE OF THE INVENTION

The present invention overcomes the above-referenced shortcomings of vehicle door assemblies by providing a snap-in plug engageable within a vehicle door drain slot. The plug is configured to substantially cover the drain slot while providing a gap through which liquid may drain out of the slot.

More specifically, in the preferred embodiment, the present invention provides a plug for a vehicle door drain slot including a base portion having opposing sides and opposing ends. The base portion is adapted to substantially cover the drain slot. First and second snap-tabs extend from one side of the base portion for securing the base portion to the slot. A plurality of stand-off members extend from the one side and are spaced about the periphery of the base portion for engaging the door to create a gap between the base portion and the door to allow water to drain out of the slot.

Accordingly, an object of the present invention is to provide a plug for substantially covering a vehicle door drain slot while allowing liquid to drain through the slot.

The above object and other objects, features and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
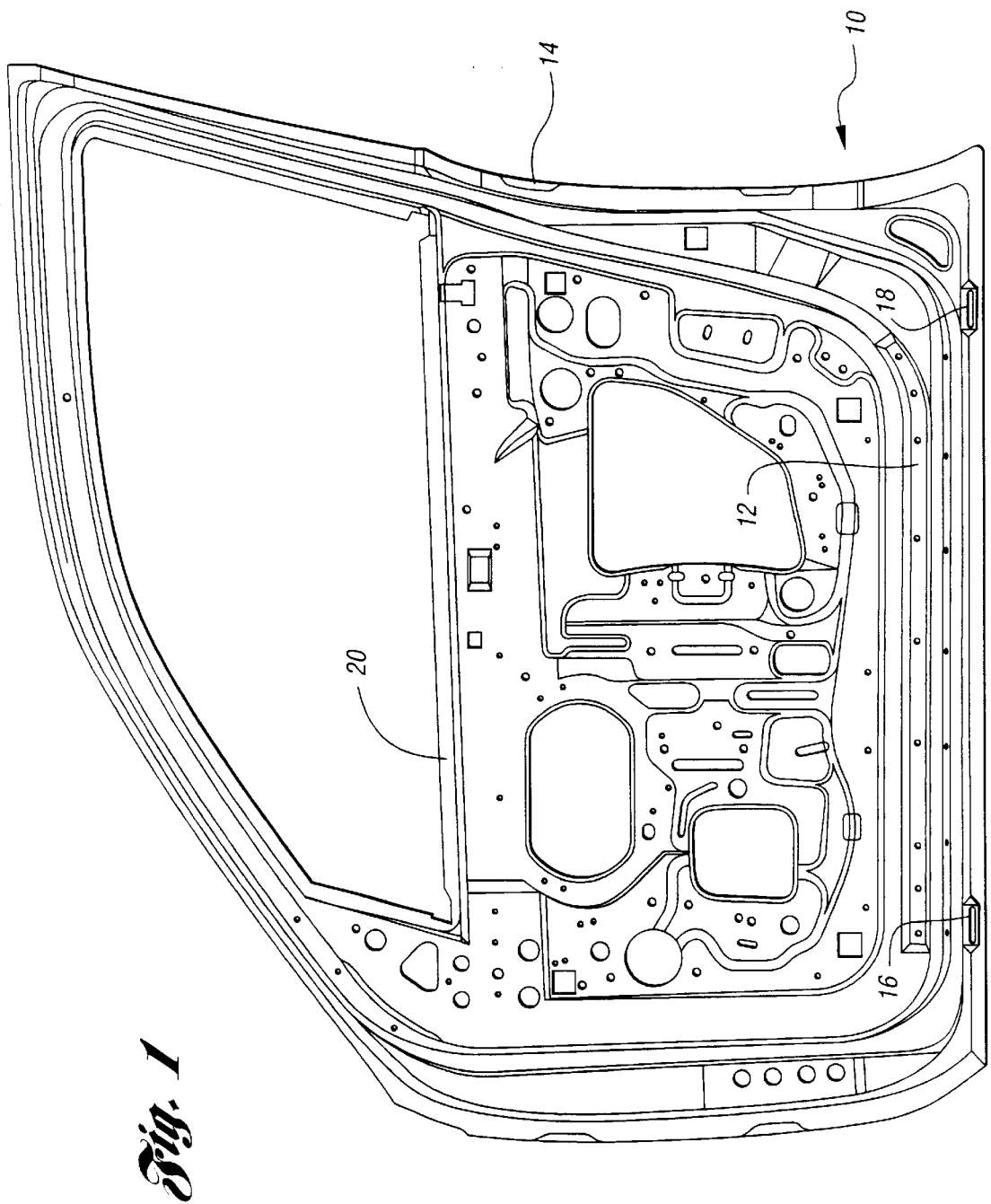
FIG. 1 shows a side view of a typical vehicle door assembly including two drain slots.
Figure 2:
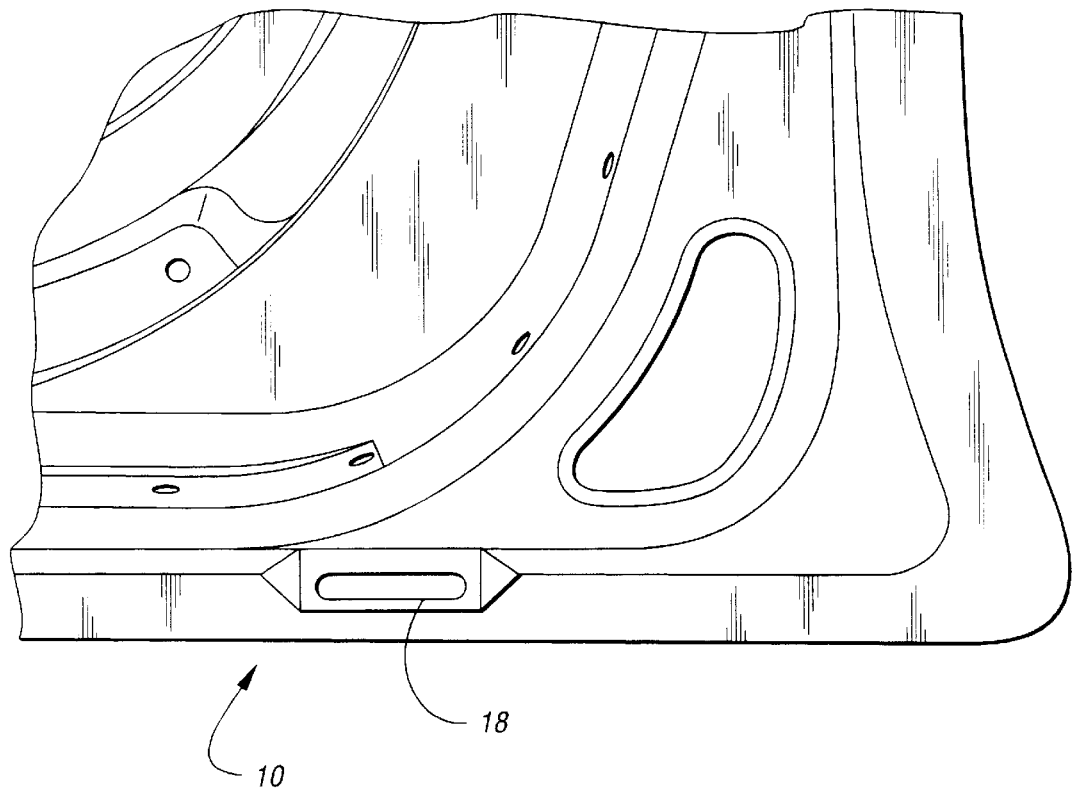
FIG. 2 shows an enlarged cut-away view of the door shown in FIG. 1.
Figure 3:
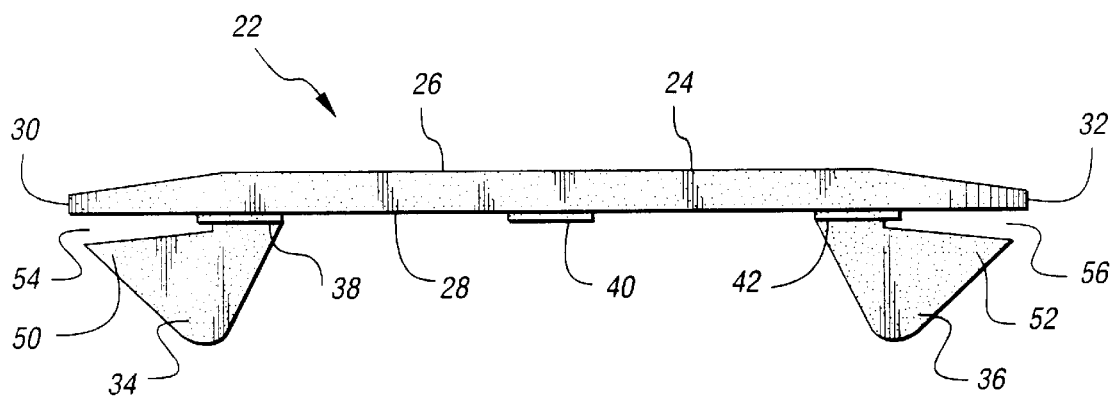
FIG. 3 shows a side view of a plug for a drain hole in accordance with the present invention.
Figure 4:
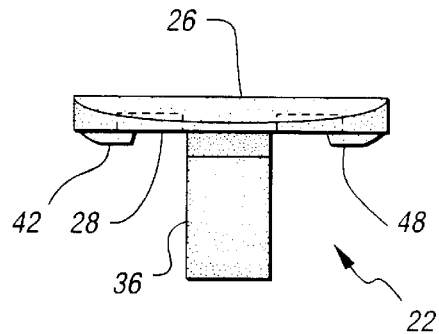
FIG. 4 shows an end view of the plug shown in FIG. 3.
Figure 5:
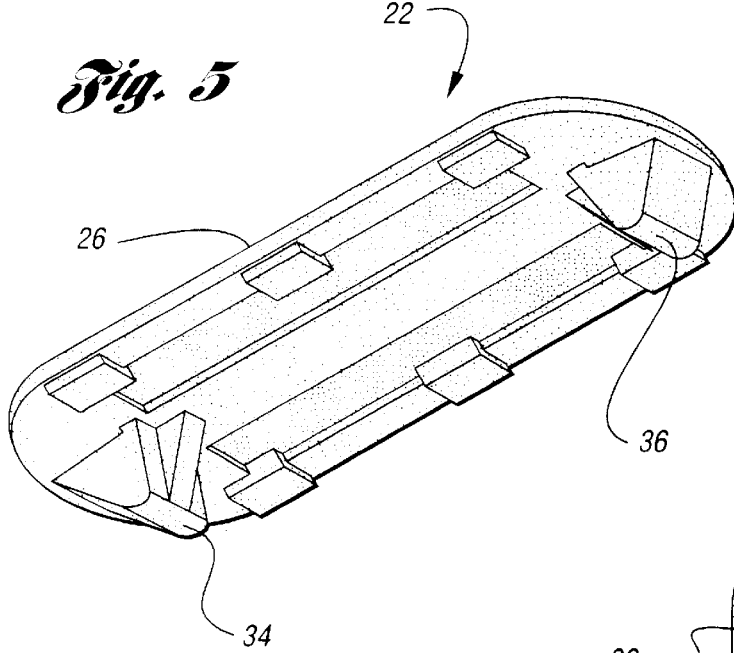
FIG. 5 shows a perspective view of the plug shown in FIG. 3.
Figure 6:
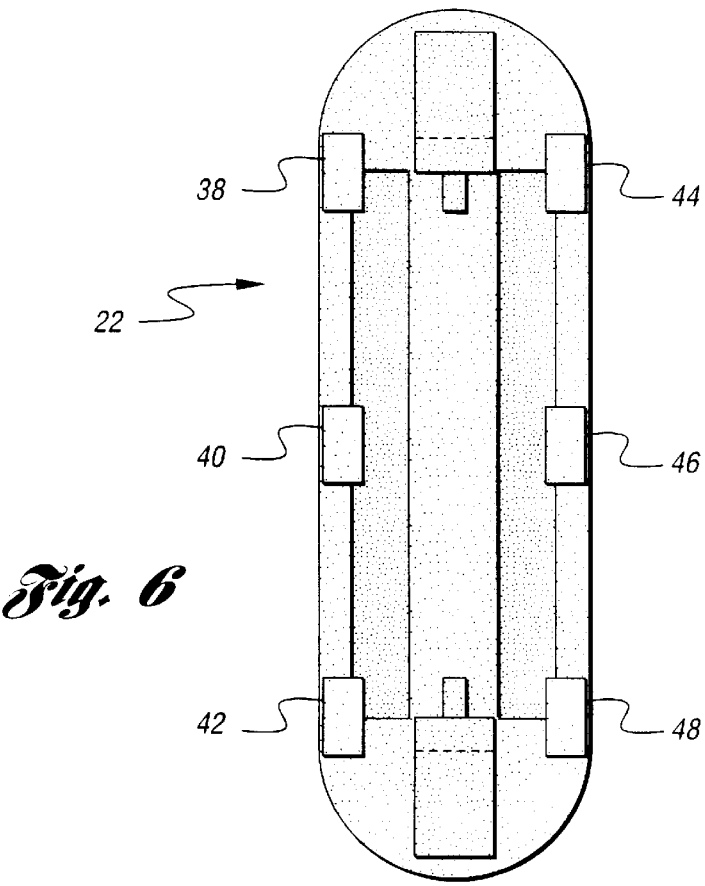
FIG. 6 shows a bottom view of the plug shown in FIG. 3.

Referring to FIGS. 1 and 2, a typical vehicle door assembly 10 is shown. The door assembly 10 typically comprises inner and outer sheet metal components 12,14 joined together to form a door. The door assembly 10 includes drain slots 16,18 formed therein for draining water or other liquids out of the door assembly 10 as the door assembly 10 is dipped in various tubs as part of the painting process. The drain slots 16,18 also provide the function of draining rain water out of the door assembly 10 when such rain water enters the door assembly 10 through the window opening area 20, or by other means.

Turning to FIGS. 3–6, a plug 22 is shown in accordance with the present invention. The plug 22 is adapted to substantially cover one of the drain slots 16,18. The plug 22 is preferably on injection-molded plastic material, such as polypropylene which is easily bendable to facilitate insertion of the plug 22 into the slots 16,18. The plug 22 includes a base portion 24 having opposing sides 26,28, and opposing ends 30,32. The base portion 24 is sized to substantially cover the drain slot 16,18.

First and second snap-tabs 34,36 extend from the base portion 24 near the opposing ends 30,32 on the lower side 28 of the base portion 24 for securing the base portion 24 with respect to the slot 16,18. A plurality of stand-off members 38,40,42,44,46,48 extend from the lower side 28 of the base portion 24 and are spaced about the periphery of the base portion 24 for engaging against the vehicle door to create a gap between the base portion 24 and the door in order to allow water or other liquids to drain out of the slot 16,18. The stand-offs 38,40,42,44,46,48 are preferably approximately one-half millimeter in height from the surface 28 to provide a sufficient gap to allow liquid to drain out of the slot past the plug 22. However, the stand-offs could vary in height.

The snap-tabs 34,36 each comprise a leg 50,52 which extends from the lower surface 28 adjacent the respective opposing end 30,32 and cooperates with the lower surface 28 to form an opening 54,56 for engagement with the door at the peripheral edge of the respective slot to secure the plug 22 in the slot.

For installation of the plug 22 within a slot 16,18, the installer must grasp the opposing ends 30,32 of the plug 22, and bend the plug such that the snap-tabs 34,36 move toward each other, thereby facilitating insertion of the openings 54,56 onto the peripheral edges of the respective slot 16,18 in the door.

Using this configuration, unwanted noise is substantially blocked from entering the drain slots 16,18, and water leakage through the slots 16,18 is allowed. Also, air pressure loss in the vehicle cabin is substantially reduced, and dirt and dust are restricted from entering the cabin by the plug.

Of course, various designs could be employed for the plug within the scope of the present invention. Various configurations could be used for the snap-tabs or for the drain feature. The main requirements are that the drain slots be substantially covered without providing a seal so that the liquid may drain from the slots.

While the best mode for carrying out the invention has been described in detail, those familiar with the art to which this invention relates will recognize various alternative designs and embodiments for practicing the invention within the scope of the appended claims.

What is claimed is:

1. A plug for a vehicle door drain slot having a peripheral edge surrounding the slot, comprising:

a base portion having opposing sides and opposing ends, said base portion being adapted to substantially cover the drain slot;

first and second snap-tabs extending from said base portion near said opposing ends on one of said sides for securing the base portion with respect to the slot; and a plurality of stand-off members extending from said one side and spaced about the periphery of said base portion and each said stand-off member having a free distal end for engaging the vehicle door to create a permanently open and unobstructed gap between the base portion and the vehicle door to allow water to drain out of the slot, said gap extending along substantially the entire peripheral edge, interrupted only by said standoff members and snap tabs.

2. The plug of claim 1, wherein each of said snap-tabs comprises a leg extending from said one side adjacent the respective opposing end and cooperating with said one side to form an opening for engaging the door to secure the plug in the slot.

3. The plug of claim 1, wherein said plug comprises an injection-molded plastic material.

4. A vehicle door assembly, comprising:

a vehicle door having at least one drain slot formed therein with a peripheral edge surrounding the slot;

a plug adapted to substantially cover said at least one drain slot; and wherein said plug comprises a base portion having opposing sides, first and second snap-tabs extending from said base portion for securing the base portion to said at least one slot, and a plurality of stand-off members extending from one of said sides and each said stand-off member having a free distal end for engaging the door around the slot to create a permanently open end unobstructed gap between the base portion and the vehicle door to allow water to drain out of the slot, said gap extending along substantially the entire peripheral edge, interrupted only by said standoff members and snap tabs.

5. The vehicle door assembly of claim 4, wherein each of said snap-tabs extend from the base portion and cooperate with the base portion to form an opening for cooperation with the door at opposing edges of the slot for securing the plug in the slot.

6. The vehicle door assembly of claim 5, wherein said plug comprises an injection-molded plastic material.

7. A plug for a vehicle door drain slot with a peripheral edge surrounding the slot, comprising:

an injection-molded base portion having opposing sides and opposing ends, said base portion being adapted to substantially cover said drain slot;

first and second snap-tabs extending from said base portion for securing the base portion to the slot, wherein each of said snap-tabs comprises a leg extending from said one side adjacent the respective opposing end and cooperating with said one side to form an opening for engaging the door to secure the plug in the slot; and a plurality of stand-off members extending from said one side and spaced about the periphery of said base portion and each said stand-off member having a free distal end for engaging the vehicle door to create a permanently open and unobstructed gap between the base portion and the vehicle door to allow water to drain out of the slot, said gap extending along substantially the entire peripheral edge, interrupted only by said standoff members and snap tabs.

* * * * *